United States Patent
Beck

(10) Patent No.: US 8,570,059 B2
(45) Date of Patent: Oct. 29, 2013

(54) METHOD AND DEVICE FOR IDENTIFYING LOW-OUTPUT PV MODULES IN A PV SYSTEM

(75) Inventor: Bernhard Beck, Volkach OT Dimbach (DE)

(73) Assignee: Adensis GmbH, Dresden (DE)

( * ) Notice: Subject to any disclaimer, the term of this patent is extended or adjusted under 35 U.S.C. 154(b) by 456 days.

(21) Appl. No.: 13/034,048

(22) Filed: Feb. 24, 2011

(65) Prior Publication Data
US 2011/0204916 A1    Aug. 25, 2011

(30) Foreign Application Priority Data
Feb. 24, 2010  (DE) .......................... 10 2010 009 080

(51) Int. Cl.
*G01R 31/26*    (2006.01)
(52) U.S. Cl.
USPC ................................ 324/761.01; 324/760.01
(58) Field of Classification Search
USPC ........................................ 324/760.01, 761.01
See application file for complete search history.

(56) References Cited

U.S. PATENT DOCUMENTS

| | | | |
|---|---|---|---|
| 4,533,870 A * | 8/1985 | Baukol et al. ................. | 324/537 |
| 6,278,052 B1 * | 8/2001 | Takehara et al. .............. | 136/244 |
| 6,512,458 B1 * | 1/2003 | Kobayashi et al. ........... | 340/635 |
| 8,159,238 B1 * | 4/2012 | Krasowski et al. ........... | 324/713 |
| 8,190,385 B2 * | 5/2012 | Rowe et al. .................... | 702/64 |
| 2009/0182532 A1 | 7/2009 | Stoeber et al. | |

FOREIGN PATENT DOCUMENTS

| | | |
|---|---|---|
| DE | 10 2007 044 166 A1 | 4/2008 |
| DE | 10 2008 003 272 A1 | 7/2009 |
| EP | 2 136 411 A1 | 12/2009 |

* cited by examiner

*Primary Examiner* — Jermele M Hollington
*Assistant Examiner* — Hoang X Nguyen
(74) *Attorney, Agent, or Firm* — Muncy, Geissler, Olds & Lowe, PLLC

(57) ABSTRACT

A method and a device for carrying out the method are disclosed in order to aid in the search for faulty photovoltaic modules. In a photovoltaic system comprising multiple PV units electrically connected in parallel, each PV unit is assigned its own fixed current sensor. Furthermore, each PV unit can be removed from the parallel circuit by a switching device.

10 Claims, 3 Drawing Sheets

METHOD AND DEVICE FOR IDENTIFYING LOW-OUTPUT PV MODULES IN A PV SYSTEM

This nonprovisional application claims priority under 35 U.S.C. §119(a) to German Patent Application No. DE 10 2010 009 080.8, which was filed in Germany on Feb. 24, 2010, and which is herein incorporated by reference.

BACKGROUND OF THE INVENTION

1. Field of the Invention

The present invention relates to a method for identifying a string with a low-output photovoltaic (PV) module within a larger PV system, and to an associated device for carrying out the method.

2. Description of the Background Art

Large PV systems can be formed of thousands of PV modules, which must be measured individually in order to detect and localize a damaged module. This effort is necessary because the presence of one, or even several, modules that are low-output, if not in fact are faulty, is not directly apparent in the total output. A faulty module in which a photovoltaic cell is non-conductive, or in which the solder joint between two cells is broken, causes failure of the entire string of, for example, ten series-connected PV modules, since a single break also breaks the series connection. For a total photovoltaic system output of 2 MW, the contribution of a single string of, e.g., 2 KW is one one-thousandth of the output. Even several faulty or low-output strings over time are not immediately apparent, since the variation in the output generated can also be weather-related and the measurement accuracy of the current transformers employed is not sufficiently accurate to detect such small variations even in the case of constant weather. Permanently installed systems for output measurement are associated with an unacceptable cost outlay.

In addition to the above problem of undetected low output capacity of the PV system, it is important, especially during the warranty period, for justified claim opportunities to be recognized in order to place responsibility on the manufacturer of the faulty PV module.

In the conventional art, various ways of testing the output capacity of PV modules are known. In all methods that provide a definitive result, the PV system, however, must be disconnected from the inverter and connected to a measuring instrument.

In this regard, multimeters are typically used as the measurement instruments, in that they measure a short-circuit current and open-circuit voltage of a PV module, a string with multiple series-connected PV modules, or a PV unit. The goal of this measurement is to recognize the basic functionality of the PV module, string, or PV unit.

If the output capacity of a PV module, string, or PV unit is to be ascertained, this is preferably done by connecting an instrument for measuring the U-I characteristic, which is capable of measuring the associated U-I characteristic. The characteristic thus measured is supplemented by the measured value of an irradiance sensor or a reference solar cell, as well as the measured value of a temperature sensor that measures the temperature of the PV module. The STC rating (Standard Test Conditions for photovoltaic modules) is calculated from the aforementioned values—irradiance, temperature, voltage, and current. However, this rating has a large inaccuracy as a result of the numerous tolerances of the sensors that are used for the calculation.

Furthermore, measurement with a clamp-on current probe is known from the conventional art, since one can use it to ascertain the current in a PV module, string, or PV unit in ongoing operation. However, since voltage, irradiance, and temperature are unknown, this type of measurement is only sufficient for testing functionality and checking fuses. Thus, the methods and devices from the conventional art produce insufficiently precise results with regard to accuracy, time required, and applicability during operation.

SUMMARY OF THE INVENTION

It is therefore an object of the present invention to detect a faulty or low-output string in which a faulty or low-output PV module is present, with a small technical effort and outlay of time.

This object is attained with respect to an embodiment of the method by the following steps: i) the direct current through one of the PV units is measured by means of the applicable fixed current sensor; ii) simultaneously or substantially simultaneously with the measurement under i), the direct current is measured with a reference ammeter; iii) for each PV unit, the difference between the current value measured by the current sensor and the current value measured by the reference ammeter is evaluated; iv) the evaluated difference is stored; v) the steps i) to iv) are repeated for all parallel-connected PV units; vi) the evaluated differences between any two desired PV units are placed in a ratio to one another; and vii) the ratios are provided to an analysis unit for ascertaining the output capacity of the relevant PV units.

In the simplest case, the evaluation of the difference between the current value measured by the reference ammeter and the current value measured by the fixed sensor can be obtained by the subtraction of the two values, so that just the variation of the fixed current sensor is sensed. If the difference is +3 amperes in comparison with the reference ammeter, this is evaluated with the factor 1 and written to the memory as +3. For the adjacent PV unit, a difference of −2 amperes in comparison with the reference ammeter is measured, and −2 is accordingly written to the memory for this PV unit. As a different criterion, e.g., for differently structured arrays as PV units, the difference in the number of PV modules in the arrays can be included in the evaluation. When PV modules from different manufacturers are used, the design-specific efficiency difference can enter into the evaluation, etc.

For the fixed current sensors, it is sufficient to use inexpensive measurement instruments with low precision. Referencing to the reference ammeter, which operates with high precision, compensates for the deviation from the actual current flow measured in the present case.

With the terminology used here, a PV unit can be understood to mean not only an individual string, but also a PV array built from multiple parallel strings, wherein a plurality of PV arrays are then wired in parallel and connected to a common inverter. For the large systems of 100 MW or more under discussion at this time, complete PV systems can also be considered as PV units in the present sense when multiple such PV systems constitute a spatially contiguous overall system.

In carrying out the method, first a substantially simultaneous measurement (also referred to in some places as sensing, ascertainment or the like) of the current through one of the PV units is undertaken by both the fixed current sensor and the reference ammeter. The simultaneous measurement is then repeated for another, e.g., the adjacent, PV unit. If the current measured by the reference ammeter has a value X, for example 100 amperes, the following situations can arise: The current measured by the current sensor is likewise X=100 A, it is less than X, thus 98 A for example, or it is larger that X, for example 103 A. Then the difference between the two currents (that measured by the current sensor and that measured by the reference ammeter) is determined in a suitable component, and possibly corrected by a correction factor that accounts for circumstances specific to the PV units. The result is then a difference of zero, or −2% for the smaller measured current, or +3% for the higher current measured by the current sensor. Hence, the differing measurement result of the current sensor with respect to the measurement result of the reference ammeter is known. This difference can also be designated or specified as a subsidiary ratio, and in the above exemplary case is then written to the memory as 1 for the equal measured currents, 0.98 for the smaller measured current, or as 1.03 for the larger measured current.

For the following example, an assumption that a subsidiary ratio of 1.15 has been measured for the first PV unit. The same sequence of steps is performed on any other desired PV unit, for example an adjacent one, and produces the subsidiary ratio of 1.12 as a result, for example. At another PV unit, for example adjacent to the second PV unit, a subsidiary ratio of 0.98 is measured. These measurements to the reference ammeter are performed until every PV unit has been sensed at least once. The results are stored in each case. If, for the sake of simplicity, one considers only the three measurements above with subsidiary ratios of 1.15, 1.12, and 0.98, then one knows that independent of the manufacturing tolerances of the individual current sensors, the PV units associated with the subsidiary ratios differ from one another in their performance in the ascertained subsidiary ratio. This observation is made at a point in time close to the installation of the system, so that the output capability of the system is measured in new condition.

The output capacities of any two desired arrays can be combined with one another as a product by multiplication of the subsidiary ratios. In the above example, the first and second PV units operate at subsidiary ratios of 1.15 and 1.12, which results in a product of 1.288. The first and third PV units operate at subsidiary ratios of 1.15 and 0.98 as compared to the reference ammeter, which results in a product of 1.127. The second and third PV units operate at subsidiary ratios of 1.12 and 0.98, which results in a product of 1.098. Alternatively, the subsidiary ratios can also be placed in ratios to one another, which then analogously results in ratios of 1.027 (1.15/1.12), 11.173 (1.5/0.98), and 1.143 (1.12/0.98).

At least two PV units should always be combined with one another, but more than two subsidiary ratios may also be combined with one another, for example by multiplying the subsidiary ratios of all three PV units together, which results in a product of 1.26 (1.15×1.12×0.98) or a ratio of 1.048 (1.15/1.12/0.98). In general, the measured values of any two desired PV units can be combined with one another. However, it is useful for the PV units that are combined with one another to be spatially adjacent to one another. There is then a high probability that analogous conditions prevailed at the time of the measurement, which is to say equal temperatures of the semiconductor in the module, equal irradiance from the sun, etc.

By comparing the ratios, products or other combinations with the corresponding values that had been produced from the measured direct currents through the PV units at an earlier point in time than the time of the present measurement or determination, it is possible to ascertain whether a change in output capacity has occurred in one of the PV units or in a group of PV units.

In a system with PV units that are not of identical design, there has heretofore been the difficulty that no direct comparison among the PV units is possible. This disadvantage is eliminated by the present method, since the differences are reflected in the subsidiary ratio on account of the referencing to the reference ammeter. For example, if a PV array has only half as many PV strings as another PV array under otherwise identical circumstances, one subsidiary ratio would be only half as large as the other subsidiary ratio. This ratio of 0.5 between them would remain constant with uniform aging, but would change with the occurrence of a fault in one of the PV units, from which circumstance it is possible to deduce the presence of a fault in one of the PV units. In this process, it is assumed that a fault that weakens the output by the same amount, which would be compensated for by the ratio formation, has not randomly arisen in each of the PV units. As already indicated, the current measurements at the current sensors of the PV units are repeated at a later time, for example several months before expiration of the warranty period or in the event of inadequate output of the system. If the ratio, product or other combination is still the same, the correct state of the PV units can be inferred with high probability, since a fault having the same effect in both units is rather improbable. In contrast, if the ratio is different, one or the other of the compared PV units must be faulty, depending on the direction of the change.

In order to achieve high reliability of the stored ratios or products, it is useful to perform the current measurement successively several times, for instance five to ten times, at brief intervals (e.g., a few milliseconds) and to obtain the arithmetic mean of the current measurements performed at short intervals. The ratio, product or other combination is then produced from the arithmetic means of the current values and is thus placed on a more solid basis. The voltage value between the two connecting lines of the PV unit, measured at the inverter for example, can also be stored together with the measured values of the direct current or the ratios.

Since every measurement has been referenced to the reference ammeter, the current sensor associated with each PV unit provides no contribution to the measurement error in later multiplication of the subsidiary ratios or in calculation of the ratio of the subsidiary ratios. Other imponderables as well, such as different contact transitions in the system wiring, variations in the energy conversion capability in the PV module, small angular variations in module mounting, etc., are also accounted for by the referencing as characteristics of the particular PV unit, and hence do not play any role when the later identification of a faulty PV unit is at issue.

The method presented is not intended for daily use, but instead for testing the output capacity of the PV system at regular intervals, for example over several months. In this regard it is acceptable that all PV units that are connected to the same inverter are kept at a constant voltage during the measurement during all direct current measurements by fixing the MPP (maximum power point) regulator of the inverter at the constant voltage value. The loss that arises for the duration of the measurement due to a mismatch with the maximum power point of the inverter is tolerable.

To judge the degree to which an individual PV unit may vary from its expected output, provision is made in a useful manner that a single PV unit is evaluated as a reference PV unit by means of current measurement, voltage measurement, irradiation intensity and direct or indirect temperature measurement at the semiconductor in accordance with the standard test conditions (STC) specified for the photovoltaic modules for evaluating the nominal output, in order to then calculate the nominal output (according to STC) of a PV unit that is linked by means of the current value pairs.

Especially in the case of PV units of identical design, such an assessment of individual performance of a PV unit can also be performed by comparison with a reference PV unit that has previously been defined as such. This is advantageously the PV unit that produced the greatest output in the initial output evaluation on a day with ideal weather, for example at the commissioning of the photovoltaic system. This output is then used as the best possible reference for the type of PV unit that is installed. If the output of any other PV unit falls below a threshold value of, e.g., 95% of the reference unit output, faulty installation or a faulty component is inferred.

With regard to the device, the object stated at the outset is attained through a photovoltaic system comprising multiple PV units (S, F) electrically connected in parallel, wherein each PV unit has its own fixed current sensor associated with it, and each PV unit can be removed from the parallel circuit by means of a switching device. The invention is based on the ability to separately connect and disconnect each participating PV unit from the parallel circuit and on the current sensor permanently associated with each PV unit.

As already described, the ratios or products stored at a time $t_0$ are compared with the corresponding ratios or products ascertained in the analysis unit at a later time $t_1$.

The reference ammeter is an instrument current transformer that measures the total current through all parallel-connected PV units. The reference ammeter can be permanently installed. It simplifies the design configuration if the high-accuracy clamp-on current probe is placed around the conductor that also contains the current sensor prior to performing a measurement.

At a later time after the combination (in particular the ratio or product generation) according to step vi), a current (I) present at one of the PV units can be measured, and the total current, or—using the applicable operating voltage values (U) of the PV units—the theoretical total output of the photovoltaic system, can be determined in an analysis unit from the one measured current value and the stored combinations, in particular the stored ratios.

In order to obtain from the simultaneous direct current measurement by the reference ammeter and the current sensor a result that is as unaffected by other factors as possible, provision is made that no current flows through other PV units during step i).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
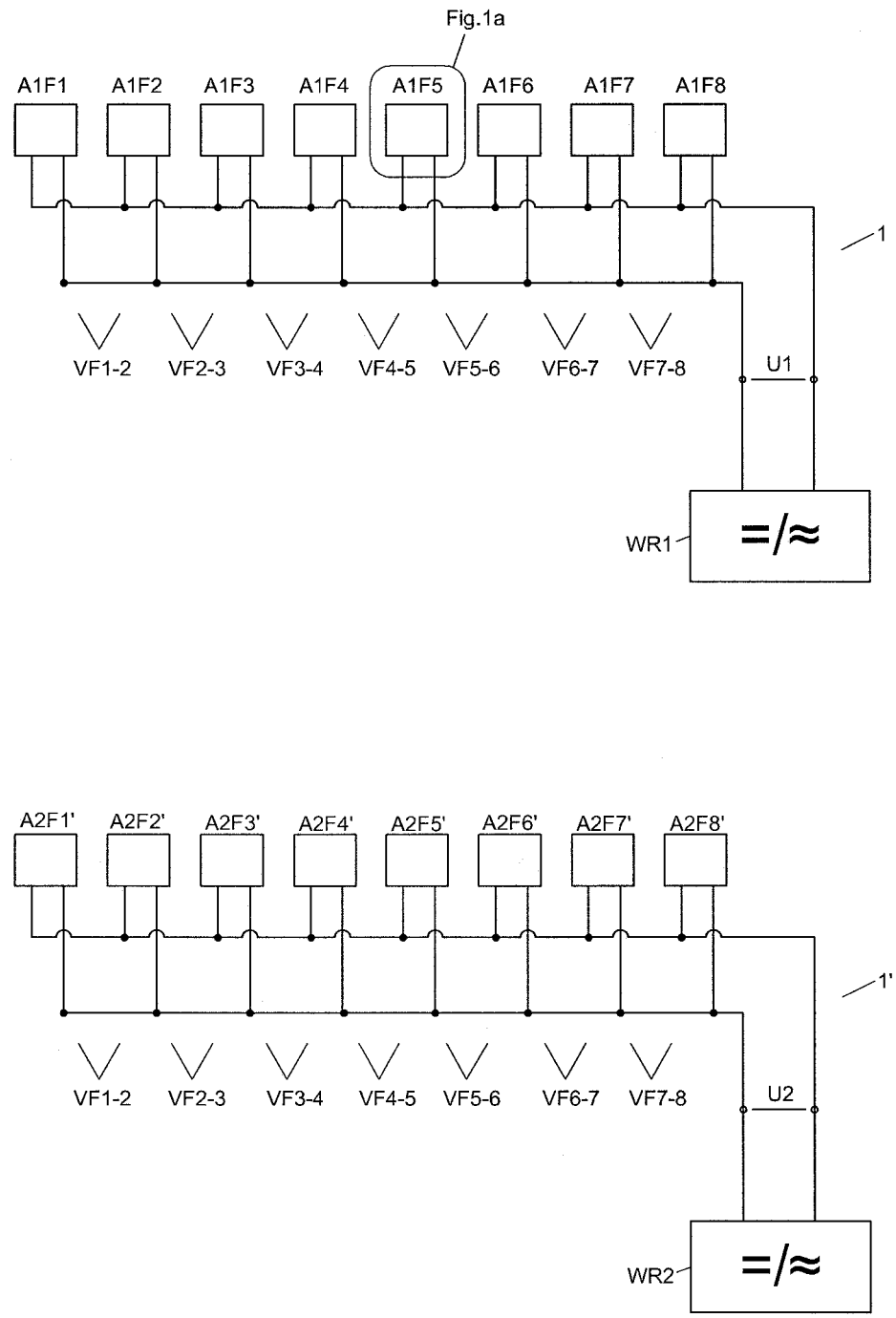
FIG. 1 illustrates a basic structure of a relatively large photovoltaic system

Labeled with 1 and 1', respectively, in FIG. 1 are a first and a second photovoltaic system, which are of identical design. This means that each PV system 1, 1' has eight arrays $F_1$ to $F_8$ or $F_1$, to $F_8$,, the designations for which are prefixed with $A_1$ for system 1 and $A_2$ for system 2. Only the first system $A_1$ is discussed in detail.

Figure 1A:
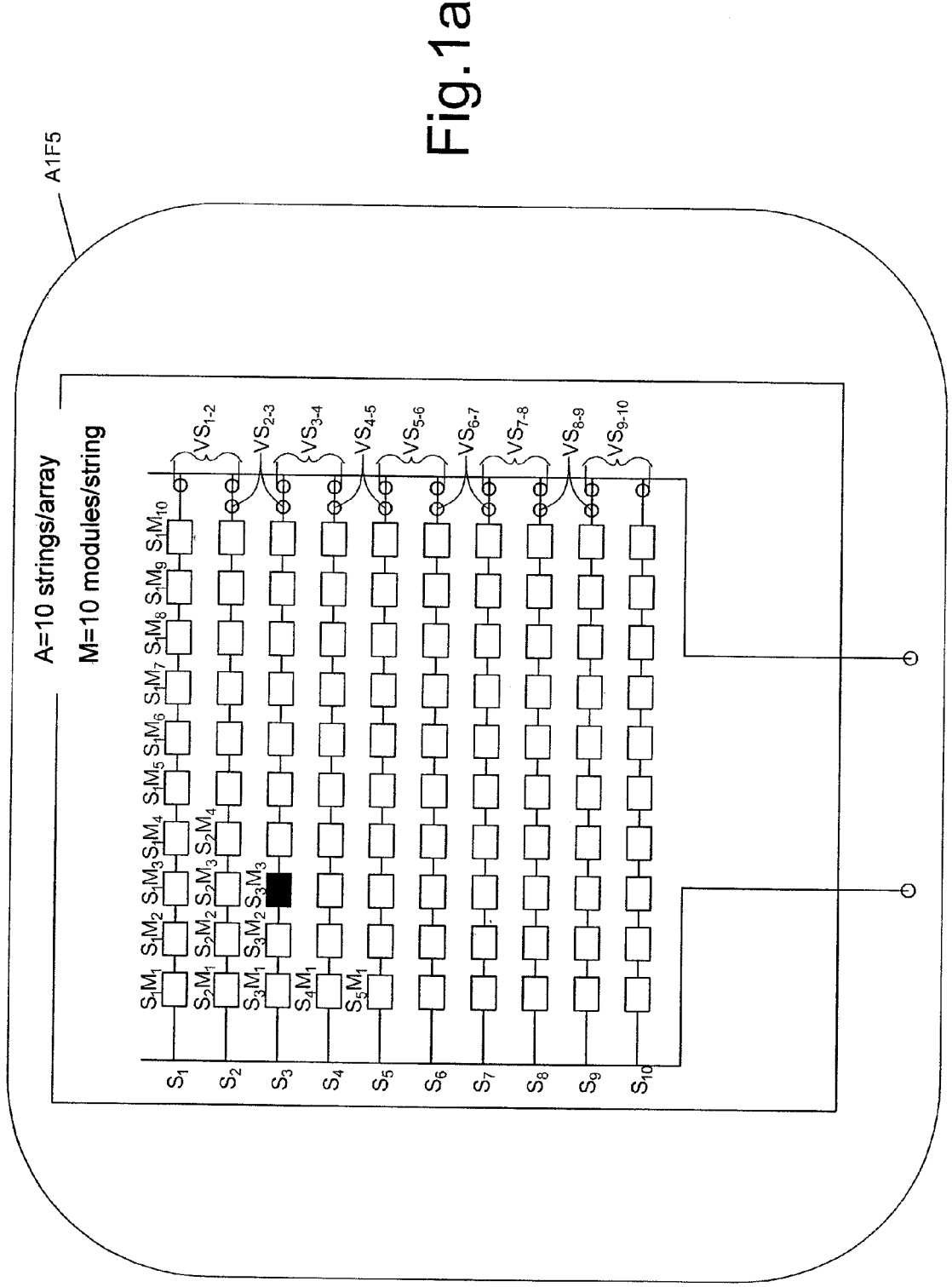
FIG. 1a illustrates an array according to an embodiment.

The first system $A_1$ has eight arrays $A_1F_1, A_1F_2, \ldots$ to $A_1F_8$, which likewise are all of identical design. As is evident in FIG. 1a from the example of the array $A_1 F_5$ (system 1, fifth array), each system array AF has ten strings, numbered $S_1$ to $S_{10}$, which are electrically connected in parallel. In turn, each string $S_1$ to $S_{10}$ has a series circuit of 10 PV modules M, which are numbered $M_1$ to $M_{10}$. One single module of the hundred PV modules $S_1M_1$ to $S_{10}M_{10}$ is shown in solid black, namely the photovoltaic module $S_3M_3$ in array $F_3$, which is assumed to have been defect-free at commissioning of the system and has become faulty over the course of time. Each module M has approximately 60 PV cells, which are connected in series. The PV cell is the smallest unit in which the sun's rays are converted into electricity. The 60 cells are connected together in series, so that at an operating voltage of 1 volt per cell a voltage of 60 volts is produced across the module. With ten modules connected in series, the voltage across the entire string, also called the string voltage, is then 600 volts. If a single cell of the 10×60=600 cells of a string S becomes nonconductive, or if one of the connections between the cells is broken, the entire string S fails for delivery of electricity as a consequence of the series connection. By way of example, such an event is supposed for the module $S_3M_3$, and it is explained below how the string $S$, and later also the module M, can be identified.

The underlying problem is of importance because, as was described in the introductory section, depending on the size of the PV system it is not immediately apparent when a single string fails, since its contribution to the total output is relatively small. Instead, it has the character of a dripping faucet that only loses small quantities of water, which nonetheless add up to a significant loss over time, over decades in the case of PV systems. Hence it is necessary for economic reasons as well as reasons based on the warranty to be able to evaluate the output condition of not just the overall system, but also individual PV units of the system.

Figure 2:
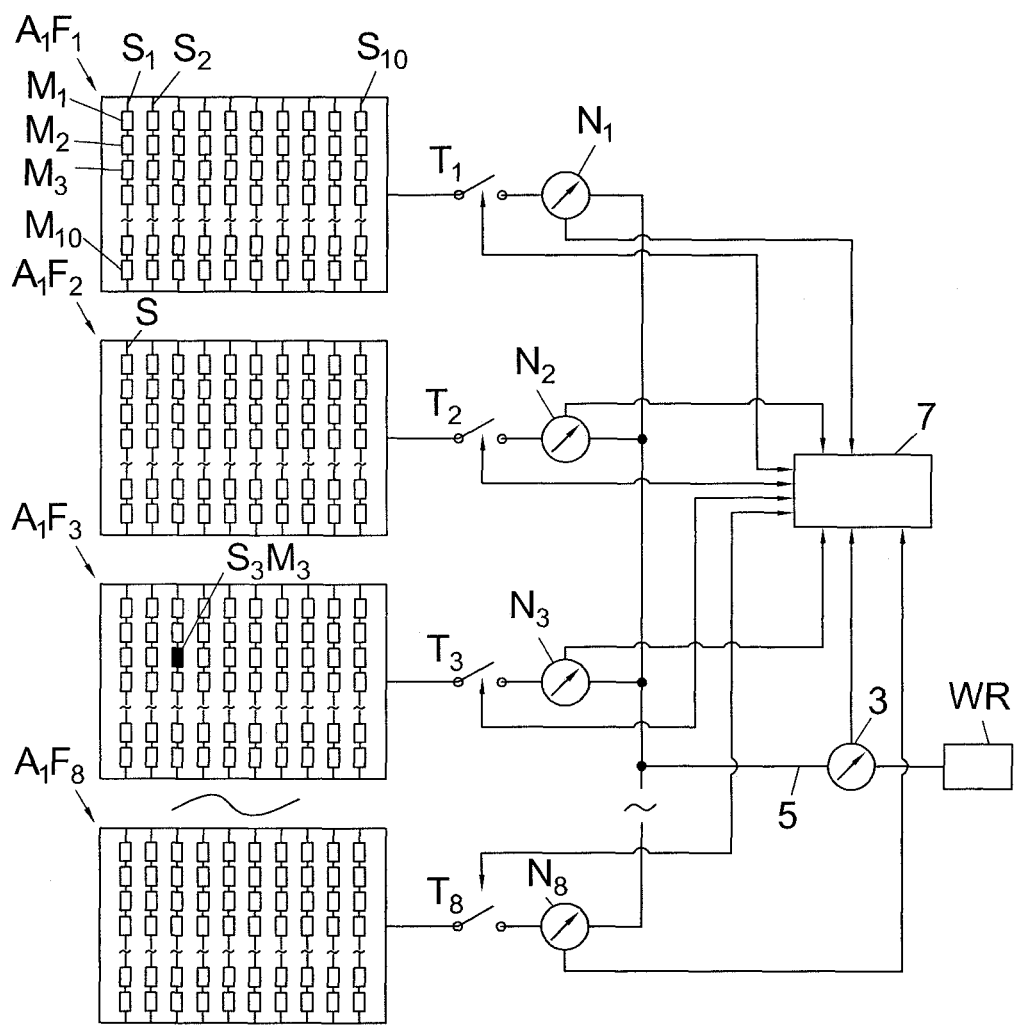
FIG. 2 illustrates a measurement and analysis unit for use in a system as shown in FIG. 1.

In FIG. 2, an array F is considered a PV unit in which a low output is to be investigated. Built into each of the eight parallel-connected arrays $F_1$ to $F_8$ of the PV system 1 is a disconnect switch $T_1$ to $T_8$ that makes it possible to remove the associated array $F_1$ to $F_8$ from the parallel connection and reconnect it to the parallel connection. Provided in series with each disconnect switch $T_1$ to $T_8$ is a current sensor $N_1$ to $N_8$ with which the direct current I flowing through the connecting line of the array F is measured. The current sensors N need not be precision instruments, since they are calibrated by a reference ammeter. The reference ammeter 3 is a very precise ammeter that is permanently built into the supply line 5 of the PV system $A_1$ to the inverter WR. Permanent installation is not a necessity. Instead, a clamp-on current probe may also be used as the reference ammeter 3, which is moved at every measurement procedure in order to measure the current I flowing through the current sensors N at the same time as this is done by the current sensors $N_1$ to $N_8$.

The current values ascertained are provided to a measurement acquisition and analysis unit 7, which compares, and if applicable evaluates, each of the simultaneously measured current values from the current sensors N and the reference ammeter 3. Preferably, the comparison can be a combination of the current value pair such that the value measured by the current sensor N is placed in a ratio to the value measured by the reference ammeter 3. The result is referred to as the evaluated difference or also the subsidiary ratio, which can be permanently associated with the array F under consideration. It states the magnitude and direction in which the measurement by the current sensor deviates from the measurement by the reference ammeter for the present photovoltaically generated direct current. In addition to the measurement tolerance, the deviation also takes into account all other parameters specific to the array under consideration, such as the length of the connecting lines, the contact resistance at line connections, the individual performance of the PV modules used in the array, etc. In order to remain within the example described above in the introductory section, an evaluated difference or subsidiary ratio of 1.15 is assumed for the array $F_1$, a subsidiary ratio of 1.12 is assumed for the array $F_2$, and a subsidiary ratio of 0.98 is assumed for the array $F_3$. In addition, for purposes of improved explanation the arrays $F_4$ and $F_5$ are also employed, for which subsidiary ratios or evaluated differences of 1.10 and 0.90 are assumed to have been ascertained. Hence, the subsidiary ratio that is present for each individual array $F_1$ to $F_8$ is determined sequentially for each of the arrays F and is stored in the measurement acquisition and analysis unit 7. This process is performed for the first time at a time $t_0$ that preferably is immediately after the commissioning of the PV system $A_1$.

It is advantageous for all other unaffected PV units to be removed from the parallel circuit at the time of acquisition of the measured value pairs (a pair is the current I measured by the current sensor and the current I measured by the reference ammeter). Thus, if the current value pair for the array $F_3$ is ascertained, the disconnect switches $T_1$, $T_2$, and $T_4$ to $T_8$ should be opened. The disconnect switches T are also controlled by the measurement acquisition and analysis unit 7.

At this point in the method, the evaluated differences for each array F, possibly in the form of subsidiary ratios, for the time $t_0$ are stored in the measurement acquisition and analysis unit 7. The sequence of the measured arrays F plays no role here; what is important is the assignment of the subsidiary ratios to the relevant array $F_x$ in which the current sensor $N_x$ is located, wherein the spatial proximity of the arrays F to one another should be taken into account in the sequence for the reasons mentioned above.

The combining of the evaluated differences, in the example here the formation of the subsidiary ratios, is also carried out in the measurement acquisition and analysis unit 7. In the simplest case, the combination is the formation of the product P or ratio V of the evaluated differences with one another. For example, if one takes the ratio V, then at the time $t_0$ for the two arrays $F_1$ and $F_2$ the result is a value $V(t_0)_{1-2}$ of 1.15/1.12=1.027, for the arrays $F_2$ and $F_3$ the result is a ratio $V(t_0)_{2-3}$ of 1.143 (1.12/0.98), for the arrays $F_3$ and $F_4$ the result is a ratio $V(t_0)_{3-4}$ of 0.891 (0.98/1.10), and for the arrays $F_4$ and $F_5$ the result is a ratio $V(t_0)_{4-5}$ of 1.222 (1.10/0.90). These values are written to a memory of the measurement acquisition and analysis unit 7, in order to compare them at a later time $t_1$, which is, e.g., a month before expiration of the warranty period, with the ratios $V(t_1)$ ascertained at that time. The advantage of this method is that it is not necessary for the identical weather conditions, temperatures, etc. to be present at the later time $t_1$, as these influences are eliminated by means of the referencing.

It is assumed in this example that at the later time all system parts are unchanged or at least are uniformly aged up until the occurrence of a fault in the third array $F_3$, whose third module $M_3$ in string $S_3$ is faulty. In and of itself, this error would lie within the range of measurement error and within the range of allowable tolerance variations, and could not be discovered with the conventional measures. With the present method, under the assumption described above the following state of affairs would exist when a current measurement is performed at time $t_1$ using the current sensors N. The currents for the PV units $F_1$ to $F_5$ ascertained with the aid of current sensors $N_1$ to $N_5$ exhibit unchanged behavior with regard to generating ratios for the arrays $F_1$, $F_2$, $F_4$, and $F_5$, since no fault is present there, hence: 1.027 for the ratio $V(t_1)_{1-2}$ and 1.222 for the ratio $V(t_1)_{4-5}$. For the array $F_3$ a smaller current is measured by the current sensor $N_3$, since the string $S_3$ has completely failed as a result of the faulty module $M_3$. If one assumes a typical string count of 10 strings S, and nine otherwise unchanged strings S, the current I measured by the current sensor $N_3$ will be smaller by 10%. Since the currents ascertained by the current sensors N are placed directly in ratios, the result is a ratio $V(t_1)_{2-3}$ of 1.0287 (1.143×0.9) instead of the original ratio $V(t_0)_{2-3}$ of 1.143. In an analogous manner, the resulting ratio $V(t_1)_{3-4}$ is 0.98 (0.891×1.1) instead of the original ratio $V(t_0)_{3-4}$ of 0.891. It is also the case here that the individual currents I of the current sensors N are best measured with open disconnect switches T for the other PV units not involved in the measurement, in this case arrays F that are not involved. Conclusions can be drawn concerning the location and severity of the fault from a comparison of the ratios $V(t_1)$ between the currents that are measured by the current sensors N at time $t_1$ with the ratios $V(t_0)$ that were established at the initial referencing and that are also to be expected for an intact system.

As has already been noted elsewhere, the evaluation of the difference according to step i) can take place through a multiplication by the factor 1 or −1, which ultimately corresponds to a representation of the absolute difference between the value measured by the current sensor and that measured by the reference ammeter. Thus, for example, the difference for one array F can be three amperes, and for the adjacent or another random array F can be 3.5 amperes. The combination of data could now be a simple summation, hence 6.5 (amperes), or a simple subtraction, hence −0.5 (amperes). If the measurement is repeated at the later time $t_1$, and the result is a sum of only 4 (amperes) or a difference of −3 (amperes), then one knows from the sum that one of the two PV units has a fault that causes 2.5 (amperes) reduced output, insofar as no uniform degradation is presupposed. With the difference, one additionally knows which of the two PV units, here arrays F, has a fault, depending on whether the difference result is −3 or +2. Additional evaluation schemes are possible; however, generation of a ratio is seen as the most effective.

With suitably robust semiconductor switches, the measurement to monitor for faults that are present can take place regularly every day, since it requires only a few seconds. Hence, the self-compensating occurrence of faults in multiple modules at the time of the measurement is avoided: for example, it is unlikely that a broken connection on a PV module, that results in failure of the string S will occur on the exact same day in both of the two adjacent arrays. This could certainly be possible over a period of a year. In contrast, the referencing in the method steps i) to v) accounts for differing aging behavior of PV modules, changes in the precision of the current sensors N, contact degradation caused by weathering, etc., and thus need only be performed infrequently.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measurement method for determining a reduction in output of a PV (Photo-Voltaic) unit within a photovoltaic system comprising a plurality of PV units electrically connected in parallel, wherein each PV unit is associated its own fixed current sensor, and each PV unit is removable from the parallel circuit by a switching device, the method comprising:

i) measuring a direct current through one of the PV units by the associated fixed current sensor;
ii) measuring substantially simultaneously with the measurement under i), the direct current with a reference ammeter;
iii) evaluating, for the PV unit, a difference between the current value measured by the current sensor and the current value measured by the reference ammeter;
iv) storing the evaluated difference;
v) repeating steps i) to iv) for each of the plurality of PV units electrically connected in parallel;
vi) combining the evaluated differences between any two desired PV units into data and calculating such in a ratio (V) to one another;
vii) providing the combined data, in particular the ratios (V), to an analysis unit; and
viii) ascertaining, via the analysis unit, an output capacity of the relevant PV units.

2. The measurement method according to claim 1, wherein the PV units are set to a same operating voltage value during the method steps i) to v).

3. The measurement method according to claim 1, wherein the analysis unit compares the ratios stored at a time $t_0$ with the corresponding ratios ascertained at a later time $t_1$.

4. The measurement method according to claim 1, wherein the reference ammeter is an instrument current transformer that measures the total current through all parallel-connected PV units.

5. The measurement method according to claim 1, wherein the differences between adjacent PV units are placed in a ratio to one another.

6. The measurement method according to claim 1, wherein, at a later time after the ratio generation according to step vi), the current present at one of the PV units is measured, and wherein the total current or using the applicable operating voltage values of the PV units, the theoretical total output of the photovoltaic system is based on the current value that is present and from the ratios.

7. The measurement method according to claim 1, wherein in step vi) all PV units have contributed to ratio generation at least once.

8. The measurement method according to claim 1, wherein the stored ratios are generated from an arithmetic mean of a number of current measurements performed successively at brief intervals.

9. The measurement method according to claim 1, wherein no current flows through other PV units during step i).

10. A device for carrying out the method according to claim 1, wherein a photovoltaic system comprising multiple PV units electrically connected in parallel, wherein each PV unit is assigned its own fixed current sensor, and each PV unit is removable from the parallel circuit by a switching device.

* * * * *